Dec. 24, 1940.   W. A. BALDWIN   2,226,045
AIR FILTER
Filed July 19, 1939   2 Sheets-Sheet 1

Inventor
Wayne A. Baldwin
By Dodge & Sons
Attorneys

Dec. 24, 1940. W. A. BALDWIN 2,226,045
AIR FILTER
Filed July 19, 1939 2 Sheets-Sheet 2
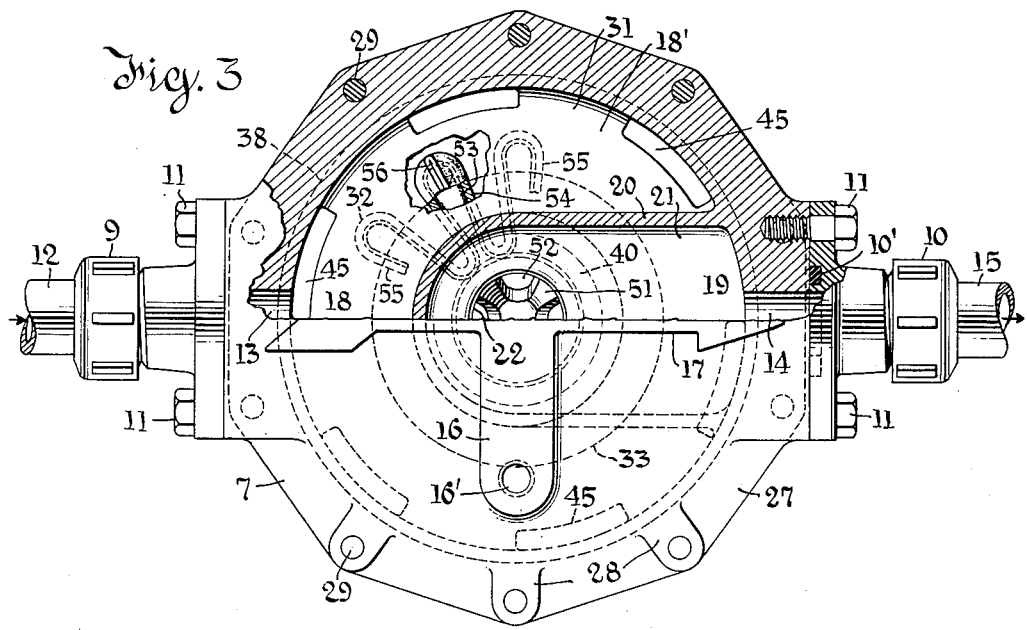
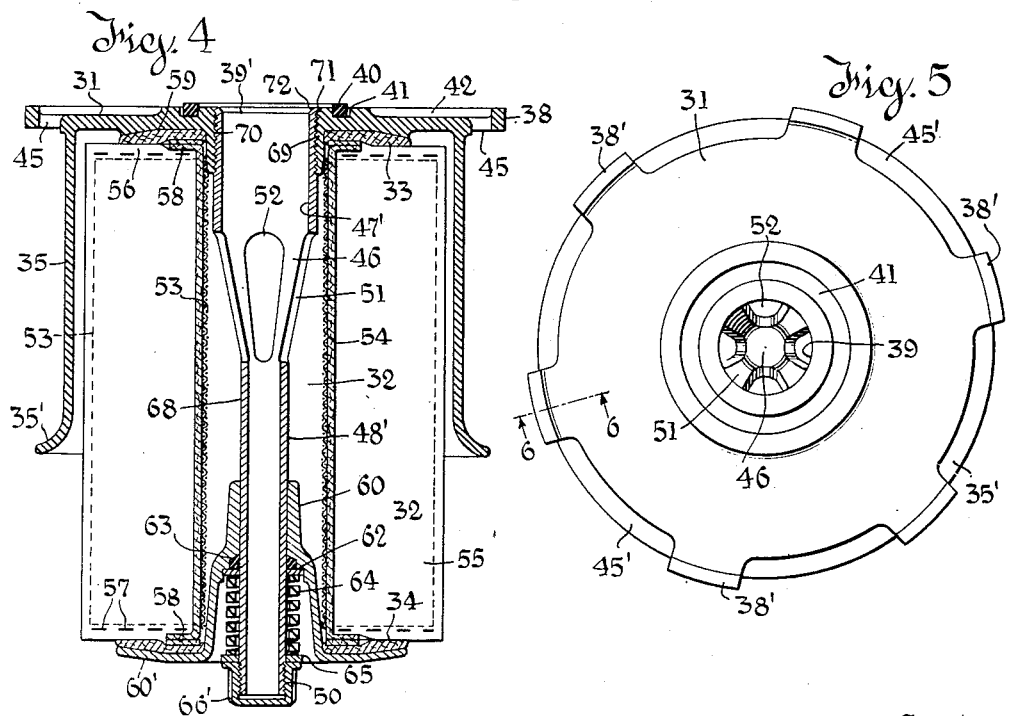
Inventor
Wayne A. Baldwin
By
Dodge & Sons
Attorneys Patented Dec. 24, 1940

2,226,045

UNITED STATES PATENT OFFICE 2,226,045

AIR FILTER

Wayne A. Baldwin, Watertown, N. Y., assignor to The New York Air Brake Company, a corporation of New Jersey Application July 19, 1939, Serial No. 285,411

12 Claims. (Cl. 183—71)

The present invention relates to air filters and especially to those of the pressure line type wherein air is passed through a cartridge or similar type filtering element for the purpose of removing foreign substances from the air stream.

Various types of filter elements or units have been introduced in railway air brake service and have proved efficient in separating water, oil, grit, dust and other impurities or foreign substances from the air stream. An important object of the present invention is the adaptation of a well-known commercial form of cartridge type filter to air brake service, although it will be obvious that the resulting filter structure may readily be used for various other purposes.

Conventional commercial filter assemblies or units have been found inadequate for railway air brake service due to the destructive action of vehicle vibration. Thus, it has been found necessary to provide a filter assembly for this purpose wherein, as in the present instance, the filtering element is mounted on a spring support so as to absorb vibration shocks; also so as to automatically compensate for reduction in size of the filter element due to wear and compression of the element in its clamping means and thus insure tight sealing engagement between the parts.

It is an important object of the invention to provide a filter device especially adapted for ready mounting in and removal from air pressure pipe lines, such for instance as an air pressure line in an air brake system on a train. A feature of the invention relates to the construction of the filter housing in sections separably connected together so that the section or part containing the filter unit proper may be removed without disturbing the housing part connected to the pipe line. The nature of the separable connection between the sections is such as to permit convenient and ready removal of the removable housing section and contained filtering unit for replacement or repairs under conditions presenting limited clearance for the purpose.

Another object is the removable mounting of the complete filter unit, including the filter element and the spring supporting and clamping means therefor, in the detachable housing part so that this housing part and undisturbed filter unit can be removed together as a unit, and the filter unit or assembly then removed from the detached housing part without disassembling the filter unit. Thus, all clamping adjustment, cleaning, etc. of the filter unit can be accomplished at a suitable location, such as a work bench, where proper inspection can be given the important elements, and thereafter the filter unit can be reinserted in the detachable housing part with the assembly ready for mounting in place again. An important feature is the provision of a hood formed as a part of the removable filter unit and serving to prevent direct impingement of water, oil, etc., on the filter element and consequent damage thereto.

A further object is the provision of means to insure equal distribution of the air flowing into the space between the filter unit hood and the detachable housing part of the device so as to provide for maximum precipitation of foreign substances.

Additional objects and advantages will be apparent from the detailed description given hereinafter in conjunction with the accompanying drawings. In the latter, which illustrate several practical embodiments of the invention:

Figure 3 is a plan of the device illustrated in Fig. 1, certain parts being broken away to show the air passages and ports and the zig-zag type filter element.

Figure 4 is a vertical axial section, similar in part to Fig. 1, of a modified form of the filter unit proper removed from the two-part filter housing of Figs. 1 to 3.

Figure 5 is a plan view of another modified form of the filter unit proper.

Figure 6 is a section on line 6—6 of Fig. 5.

Figure 1:
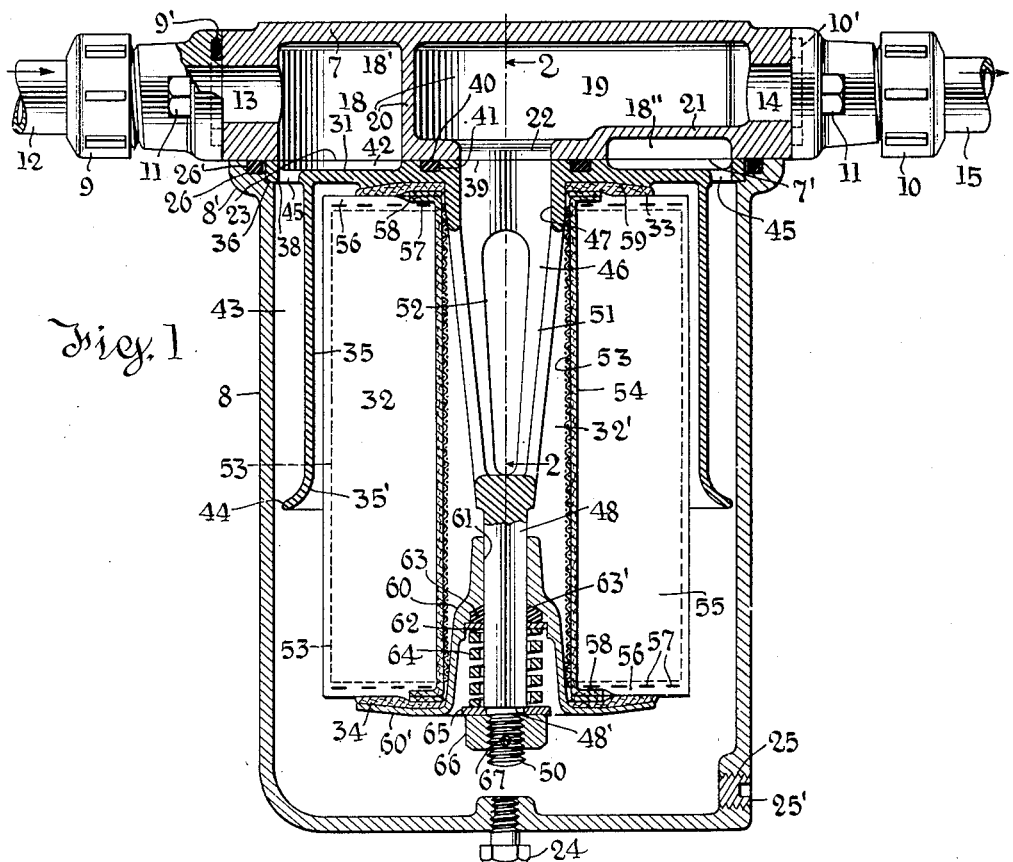
Figure 1 is a vertical axial sectional view of the preferred form of the filter constructed in accordance with the invention, the filter device being shown completely assembled and mounted in place in a pressure fluid pipe line, such for instance as a pipe line in an air brake system.
Figure 2:
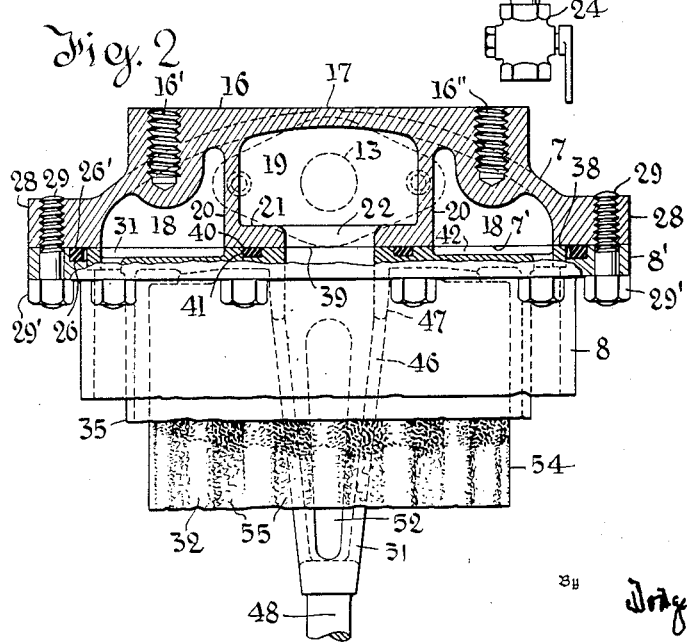
Figure 2 is a fragmentary section on line 2—2 of Fig. 1, showing certain of the parts in side elevation.

Referring to the preferred construction of Figs. 1 to 3, the filter shown comprises a two-part housing including a substantially circular, upper or main housing or body part 7 and a detachable lower or supplemental housing or body part 8. Housing part 7 has an inlet connection 9 for the air to be filtered and an outlet connection 10. Each of these connections comprises a well-known commercial type of reenforced flange union fitting securely bolted and sealed to upper housing part 7 by cap screws 11, 11 and gaskets 9', 10'. Connection 9 connects air inlet pipe 12 to filter inlet port 13, while connection 10 connects filter outlet port 14 with air outlet pipe 15. Thus, the complete filter is supported in the pipe line, but may be readily removed therefrom by disconnecting union connections 9 and 10.

Upper housing part 7, which is dome-shaped as indicated in Fig. 2, is formed on its top with a flat, elongated bearing surface 16 (see Figs. 2 and 3). Surface 16 is tapped at 16' and 16'' to receive any suitable fastening means, such as stud bolts and nuts, whereby the complete filter assembly may be securely and rigidly mounted on any convenient means of support. This support may comprise a bracket or any other body against which surface 16 may bear. At right angles to surface 16 and flush therewith, housing portion 7 is formed with an air flow indicating or directional arrow 17 which appears partly in plan in Fig. 3. This arrow not only indicates the inlet and outlet connections but also forms a cross-bearing with surface 16 which likewise contacts the support to guard against lateral movement of the filter assembly thereon.

Inlet 13 in housing part 7 leads to an inlet chamber 18, the upper portion 18' of which is U-shaped (see Fig. 3) and the lower portion 18'' of which is annular so as to extend completely around the periphery of housing part 7 and beneath outlet chamber 19 (see Fig. 1). Outlet chamber 19, which is formed by vertical partition 20 and horizontal partition 21, communicates with outlet port 14 and a port 22 opening centrally onto the lower plane face 7' of upper housing part 7. The lower annular portion 18'' of inlet chamber 18 is entirely open on its underside and thus forms an annular port 23 surrounding port 22 and also opening onto the lower flat face 7' of upper housing member 7.

Lower body or housing part 8 is of cylindrical cup-shape and at its upper flat open end is formed with an external peripheral flange 8'. Housing part 8 is provided with the usual drain cock 24 and an alternative tapped side port 25 which is normally closed by a plug 25' when the drain cock is located as shown.

Lower housing part 8 is counterbored at 26 to receive an annular ring gasket 26' which provides a seal between the upper and lower housing members 7 and 8. A peripheral flange 27 is formed on upper body part 7, corresponding to flange 8' on the lower body part, and at equally spaced points is provided with tapped lugs 28. Mounted in these lugs are stud bolts 29, the lower threaded ends of which project through corresponding openings in flange 8' on the lower body 8 to receive nuts 29', whereby housing parts 7 and 8 are rigidly but detachably clamped in tight sealing relation with each other.

The filter unit which is removably mounted in the detachable lower body part 8 will now be described. This unit comprises a disc-shaped mount or head portion 31, a generally annular filter element or cartridge 32, end sealing gaskets 33, 34 therefor, spring-type supporting and clamping means for the filter element carried by mount 31, and an annular protecting skirt 35 for the filter element also carried by the mount 31. Lower body part 8 has a second counterbore 36 at its upper end which slidably receives the annular marginal portion 38 of mount 31 to support this member and the rest of the filter unit in place. The thickness of portion 38 slightly exceeds the depth of counterbore recess or rabbett 36 so that mount 31 is securely clamped between upper and lower housing parts 7 and 8 when assembled in place. The upper surface of mount 31 which surrounds a central port 39 therein registering with port 22 in upper body part 7, seals with the latter by means of a compression gasket 40 located in an annular groove 41 in mount 31. The upper surface of mount 31 is also formed with an annular shallow groove 42 communicating with and forming an extension of inlet chamber 18 in body part 7.

Depending from mount 31 is the annular skirt 35 which surrounds but is spaced somewhat from filter element 32 and is spaced from the inner surface of housing part 8 to form an annular air passage 43. Skirt 35 extends downwardly slightly farther than half the height of filter element 32 and is flared at 35' at its lower edge to provide limited clearance 44 with the interior of the housing, the purpose being to deflect any water, oil or other foreign substances and prevent direct impingement thereof on filter element 32. Mount 31 is provided with an annular series of equally-spaced arcuate openings 45 which place inlet chamber 18 in housing part 7 in communication with annular passage 43 surrounding skirt 35 in housing part 8.

The supporting means for filter cartridge or insert 32 includes a central integral guide stem 46 depending from mount 31 through axial open-ended passage 32' extending through cartridge 32. Stem 46 includes an enlarged tubular top portion 47 connected to port 39 and snugly receiving the upper end of filter element 32. The lower portion 48 of the stem, which is in the form of a rod, has an annular shoulder 48' near its lower extremity and a threaded end portion 50. A hollow tapered portion 51 connects upper and lower stem portions 47 and 48 and is formed with openings 52 to provide communication between passage 32' in the filter cartridge and outlet chamber 19 in the upper body member 7.

The replaceable filter element 32 which is employed is preferably of the well-known rigid zig-zag type, although any other suitable form of cartridge may be used. The zig-zag type filter element illustrated, together with its end sealing gaskets, are fully shown and described in the co-pending U. S. application of Charles A. Campbell for filters, Serial No. 191,324, filed February 18, 1938 (assigned to the same assignee as the present case and now Patent No. 2,189,704, dated February 6, 1940), to which reference is made for a more detailed description.

As shown here, filter element 22 consists of a wire screen or other foraminous metal reenforcement or framework 53 and a fabric covering 54, such as wool flannel, sustained by the framework and completely covering the same externally. Screen 53 and covering 54 are folded together to form a series of longitudinally-extending hollow radial vanes 55 arranged in annular form around and communicating with the axial passage 32' in the filter element. The annular series of vanes 55 is indicated in part in dotted lines in Fig. 3. Cover 54 is extended at 56 at the upper and lower ends of vanes 55 and the layers brought together and stapled as indicated at 57 to cover the ends of the vanes. Cover 54 at each end of the filter element is formed with an annular series of folded overlapping tabs 58 designed to prevent leakage between element 32 and its clamping or supporting means at the inner junctures of vanes 55.

Surrounding stem portion 47 is a wide annular seat 59 between which and the upper end of filter element 32 is interposed the wide annular felt or other sealing gasket 33. The latter is coextensive with said seat and, as is the case with the similar bottom sealing gasket 34, engages the major portion of the adjacent end surface of the filter unit so as to distribute the compression load of the clamping means thereon and prevent damage to the element.

Slidably mounted on portion 48 of the stem or yoke 46 is an inverted cup-shaped retaining member or follower 60 formed with an annular flange 60' engaging and supporting sealing gasket 34 with which it is coextensive. Stem portion 48 depends through an opening 61 in follower 60 and receives a washer 62 within the follower which functions both as a spring seat and a packing gland. Washer 62 coacts with felt packing ring 63 in an annular recess 63' in the follower to prevent air leakage at this point. A coil spring 64 is interposed under compression between washer 62 and a second spring-seat washer 65. Washer 65 bears against shoulder 48' on stem 46. It is secured in place by a castellated nut 66 locked in adjusted position by a cotter pin 67. Shoulder 48' prevents undue application of pressure to spring 64 by washer 65.

Thus, with the arrangement described, follower 60 not only closes the lower end of passage 32' in filter element 32 but, due to spring 64, provides a yieldable support for element 32 while exerting a constant upward but resilient clamping force on said element. This serves to clamp follower 60, filter element 32, end gaskets 33, 34 and gasket seat 59 in firm sealing engagement with each other, and insures maintenance of such engagement under all conditions because of the automatic follow-up clamping action of the follower on the filter element. Certain of the described features of the filter unit relating to the assembled mount or head portion, gaskets, filter element and spring supporting means form no part of the present invention, except in combination with other features of the filter device herein described. The features are claimed broadly in Campbell application Serial No. 191,324 (Patent No. 2,189,704) aforementioned, and are claimed herein only in combination with other features.

In operation, the air entering inlet chamber 18 from inlet 13 passes therefrom through the annular series of equally-spaced openings 45 and into annular space 43 around skirt 35. This arrangement insures equal distribution of the inflowing air into annular space 43 and thence through annular restricted space 44, whereby to provide for maximum precipitation of foreign substances from the air stream into the bottom of lower housing part 8. The partially cleaned air then passes through filter element 32, where the remainder of the entrained foreign substances is removed, and then flows by way of port 22 into outlet chamber 19 whence the cleaned air passes to outlet pipe 15.

It will be noted that, in effect, skirt 35, together with the main body of mount 31, forms an inverted cup-shaped protecting hood within which the other parts of the filter unit are supported; also that the outer marginal portion of mount 31 forms an annular flange at the upper end of said hood by means of which the hood and the rest of the filter unit are suspended in housing part 8.

When repairs, replacements or adjustments are needed, nuts 29' are removed from their studs 29. Thereupon, lower housing part 8 with the filter unit still suspended therein may be detached and removed as a unit assembly. This simply requires that housing part 8 be lowered a distance equal to the projection of studs 29 below the lower face 7' of upper body part 7. This arrangement permits convenient lateral removal of the lower body part under conditions presenting limited bottom clearance below the filter device. During this operation it will be noted that the filter unit or assembly which is supported on mount or head portion 31 has not been disassembled or disturbed in any way. The detached portion of the device may now be removed to a workbench or other suitable location, whereupon the undisturbed filter unit is lifted from housing part 8, inspected, repaired or adjusted, and again assembled with housing part 8. This assembly is then reassembled with upper body part 7 as shown in Fig. 1 and secured by nuts 29'.

The modified removable filter unit of Fig. 4 is identical with that of Figs. 1 to 3, except that in the former the supporting stem 46 for the filter element 32 is constructed in part of a separate tubular member 68 instead of being formed entirely as a single, cast supporting stem which is integral with mount 31 as in Figs. 1 to 3. In Fig. 4, stem 46 comprises tubular member 68 and a central depending boss 69 formed integrally with mount 31. Filter element 32 fits on boss 69, while the lower open end of element 32 receives and is supported by follower 60. Opening 70 through boss 69 is threaded to receive the threaded and enlarged upper end 47' of tube 68 which is open at its upper end to form a port 39'. Boss opening 70 is flared at 71 and the upper end of tubular member 68 peened over at 72 to rigidly lock the parts together.

Tube 68 has the intermediate tapered portion 51 with openings 52 and a lower reduced portion 48' on which follower 60 is mounted. Felt sealing ring 63, bearing washers 62 and 65 and spring 64 are identical with these parts in Figs. 1 to 3, except that there is no shoulder on member 68 with which lower washer 65 engages. Nut 66', which holds spring 64 under compression, is a commercial form of pipe cap having tapered threads coacting with similar threads on the lower end of tubular member 68 which eliminates the need of a locking connection between these parts.

In the modified filter unit of Figs. 5 and 6, the construction is identical with that of the unit shown in Figs. 1 to 3, except that, in order to reduce the weight, the disc-shaped mount or head portion 31 is modified around its outer marginal portion to provide an annular series of equally spaced, radial lugs or projections 38'. Lugs 38', similarly to marginal supporting portion 38 in Figs. 1 to 3, are machined to the diameter of counterbored recess 36 in housing part 7 to provide a sliding fit therewith. Thus, in effect, the filter unit includes an inverted cup-shaped hood formed by annular skirt 35 and mount 31, which hood is provided at its top with means in the form of lugs 38' for removably suspending the unit in place in housing member 8. When thus mounted in place, the spaces 45' between lugs 38' coact with housing part 8 to form an annular series of equally-spaced arcuate openings, similar to openings 45 in Figs. 1 to 3, for passage of the incoming air from inlet chamber 18 into annular passage 43 in housing part 8.

Although the invention has been described in some detail, no necessary limitation thereto is implied and modifications are contemplated within the scope of the claims.

What is claimed is:

1. The combination in a filter of a main housing part having an inlet chamber provided with an inlet and an annular outlet and an outlet chamber provided with a central inlet and an outlet, said annular outlet surrounding said central inlet; a cup-shaped supplemental housing part detachably secured to the main housing part and having its upper open end sealed against the same; and a filter unit removably mounted in the upper end of said supplemental housing part, said housing part and the filter unit being removable together for subsequent free removal of the unit therefrom, the filter unit including a hollow filter element, a cup-shaped hood member forming a hood-surrounding passage with the interior of the supplemental housing part and encasing the upper portion of the filter element, means for supporting the filter element on the hood member, and means for so supporting the hood member in the supplemental housing part that the filter is located entirely within the supplemental housing part, the hood being provided with an air connection in its top communicating only with the interior of the filter element and the outlet chamber in the main housing part, while said hood supporting means are formed to provide communication between said annular outlet for the inlet chamber in the main housing part and the interior of the supplemental housing part externally of the filter element.

2. The combination in a filter of a main housing part having an inlet chamber provided with an inlet and an outlet and an outlet chamber provided with an inlet and an outlet; a cup-shaped supplemental housing part detachably secured to the main housing part and having its open upper end sealed against the same; and a filter unit removably mounted in the upper end of said supplemental housing part, the filter unit comprising a hollow filter element, a cup-shaped hood member forming a surrounding passage with the interior of the supplemental housing part and encasing the upper portion of the filter element, means for supporting the filter element on the hood member, and means for supporting the hood member in the supplemental housing part, said last-mentioned supporting means comprising an annular external flange on the hood member clamped around its margin between the upper end of the supplemental housing part and the main housing part to secure the filter unit in place but adapted for release to permit removal of the supplemental housing part and the filter unit together and free removal of the unit from the supplemental housing part upon disconnection of the latter from the main housing part, said flange being formed with an annular series of openings providing communication between the interior of the supplemental housing part externally of the filter element and said outlet for the inlet chamber in the main housing part by way of said passage surrounding the hood, and the hood top having an air connection communicating only with the interior of the filter element and the outlet chamber in the main housing part.

3. The combination in a filter of a main housing part having an inlet chamber provided with an inlet and an outlet and an outlet chamber provided with an inlet and an outlet; a cup-shaped supplemental housing part detachably secured to the main housing part and having its open upper end sealed against the same; and a filter unit removably mounted in the upper end of said supplemental housing part, the filter unit comprising a hollow filter element, a cup-shaped hood member forming a surrounding passage with the interior of the supplemental housing part and encasing the upper portion of the filter element, means for supporting the filter element on the hood member, and means for supporting the hood member in the supplemental housing part, said last-mentioned supporting means comprising an annular series of spaced external lugs on the hood member clamped at their outer marginal portions between the upper end of the supplemental housing part and the main housing part to secure the filter unit in place but adapted for release to permit removal of the supplemental housing part and the filter unit together and free removal of the unit from the supplemental housing part upon detachment of the latter from the main housing part, the spaces between the lugs coacting with the supplemental housing part to form an annular series of passages providing communication between the interior of the supplemental housing part externally of the filter element and said outlet for the inlet chamber in the main housing part by way of said hood surrounding passage, and the hood top having an air connection communicating only with the interior of the filter element and the outlet chamber in the main housing part.

4. The combination in a filter of a main housing part having an inlet chamber provided with an inlet and an annular outlet and an outlet chamber provided with a central inlet and an outlet, said annular outlet surrounding said central inlet; a supplemental cup-shaped housing part detachably secured to the main housing part and having its open end sealed against the same; and a filter unit removably mounted in said supplemental housing part and removable therewith for subsequent free removal therefrom, said filter unit comprising a mount supported in said supplemental housing part, a hollow filter element, and means for supporting the filter element on the mount, the mount being provided with an air connection communicating only with said inlet for the outlet chamber in the main housing part and the interior of the filter element and also provided with at least one air connection communicating only with said annular outlet of said inlet chamber and the interior of the supplemental housing part externally of the filter element.

5. The combination in a filter of a main housing part having an inlet chamber provided with an inlet and an outlet and an outlet chamber provided with an inlet and an outlet; a supplemental cup-shaped housing part detachably secured to the main housing part and having its open end sealed against the same; and a filter unit removably mounted in said supplemental housing part, the filter unit comprising a disk-shaped mount supported in the open end of the supplemental housing part and having a depending annular skirt located inwardly of its periphery and forming a skirt-surrounding passage with the interior of the supplemental housing part, a hollow filter element, and means for supporting the filter element on the underside of the mount, the marginal portion of said mount outside of its skirt being clamped between said housing parts to secure the filter unit in place but adapted for release to permit removal of the supplemental housing part and the filter unit together and free removal of the unit from the supplemental housing part upon disconnection of the latter from the main housing part, the mount and skirt together forming an inverted cup-shaped protective hood encasing the upper portion of the filter element, said marginal portion of the mount having at least one air connection leading to said skirt-surrounding passage from the outlet for the inlet chamber in the main housing part, and the mount having an air connection communicating only with the interior of the filter element and said outlet chamber in the main housing part, the filter unit being located entirely within the supplemental housing part whereby to facilitate movement of the latter transversely of the main housing part when detached therefrom.

6. The combination in a filter of a main housing part having an inlet chamber provided with an inlet and an outlet and an outlet chamber provided with an inlet and an outlet; a supplemental cup-shaped housing part detachably secured to the main housing part and having its open end sealed against the same; releasable connecting means for said housing parts; and a filter unit removably mounted in said supplemental housing part and removable therewith for subsequent free removal therefrom, the filter unit comprising a mount supported in said supplemental housing part, a hollow filter element, and means for supporting the filter element on the mount, said filter unit being located wholly within the supplemental housing part whereby to facilitate movement of the latter laterally of the main housing part upon detachment of the supplemental housing part therefrom, the mount having an air connection communicating only with said outlet chamber in the main housing part and the interior of the filter element and also having at least one air connection communicating only with the outlet of said inlet chamber and the interior of the supplemental housing part externally of the filter element.

7. The combination in a filter of a main housing part having an inlet chamber provided with an inlet and an outlet and an outlet chamber provided with an inlet and an outlet; a supplemental cup-shaped housing part detachably secured to the main housing part and having its open end sealed against the same; a filter unit removably mounted in said supplemental housing part and removable therewith for subsequent free removal therefrom, the filter unit comprising a mount supported in said supplemental housing part, a hollow filter element, and means for supporting the filter element on the mount; threaded studs on the main housing part extending through openings in the supplemental housing part; and nuts on said studs to detachably secure the housing parts together, said filter unit being located entirely within the supplemental housing part whereby to facilitate movement of the latter transversely of the main housing part upon detachment of the supplemental housing part therefrom, the mount having an air connection communicating only with said outlet chamber in the main housing part and the interior of the filter element and also having at least one air connection communicating only with the outlet of said inlet chamber and the interior of the supplemental housing part outside of the filter element.

8. The combination in a filter of a main housing part having an inlet chamber provided with an inlet and an annular outlet portion and an outlet chamber provided with a central inlet and an outlet, said annular outlet chamber portion surrounding said central inlet; a supplemental cup-shaped housing part detachably connected to the main housing part with its upper open end sealed against the same; and a filter unit removably mounted in said supplemental housing part, the filter unit including a hollow filter element, an inverted cup-shaped hood member forming a hood-surrounding passage with the interior of the supplemental housing part and encasing the upper portion of the filter element, means for supporting the filter element on the hood member, and means for supporting the hood member in the supplemental housing part, said last-mentioned means comprising an annular external flange on the hood member which is located in an annular rabbet in the upper edge of the supplemental housing part and clamped between said housing parts to secure the filter unit in place but adapted for release to permit removal of the supplemental housing part and filter unit together and free removal of the unit from the supplemental housing part upon disconnection of the latter from the main housing part, said flange being located at the upper closed end of the hood member and coacting therewith to provide a disk-like top for said member, the upper surface of said disk being substantially flush with the top of the supplemental housing part and having an annular recess coacting with said annular outlet portion of the inlet chamber to form an annular air passage, the hood flange having at least one air connection leading to said hood surrounding passage from said annular passage and the mount having an air connection leading from the interior of the filter element to the outlet chamber in the main housing part.

9. The combination of claim 4 wherein said mount, which is of disc form, is supported in the open end of the supplemental housing part and has a depending annular skirt located inwardly of its periphery and forming a skirt-surrounding passage with the interior of the supplemental housing part; and wherein the marginal portion of the mount outside of said skirt is clamped between said housing parts to secure the filter unit in place and said marginal portion is provided with an annular series of equally spaced air connections leading from said annular outlet for the inlet chamber in the main housing part to said skirt-surrounding passage, said mount and skirt together forming an inverted cup-shaped protective hood encasing the upper portion of the filter element.

10. The combination in a filter of a main housing part having an outlet chamber therein provided with an inlet port and an outlet port; a supplemental housing part detachably secured to the main housing part and having an open end sealed against the same; and a filter unit mounted in the open end of said supplemental housing part for removal with said supplemental housing part while still assembled therewith and for subsequent free removal from the supplemental housing part without disturbance of the assembly of the unit, the filter unit including a mount supported in the supplemental housing part, a hollow filter element and means for supporting said element on the mount, said filter unit being located entirely within said supplemental housing part whereby to facilitate movement of the latter laterally of the main housing part upon removal of the supplemental housing part therefrom, the mount being provided with an air connection communicating only with the interior of the filter element and the inlet port for said outlet chamber and the supplemental housing part being adapted to receive air externally of said filter element for passage therethrough.

11. The combination in a filter of a main housing part having an inlet chamber provided with an inlet and an annular outlet and an outlet chamber provided with a central inlet and an outlet, said annular outlet surrounding said central inlet; a cup-shaped supplemental housing part detachably secured to the main housing part and having its upper open end sealed against the same; and a filter unit removably mounted in the upper end of the supplemental housing part and removable therewith for subsequent free removal therefrom, said filter unit comprising an annular filter element having an axial passage extending therethrough, an inverted cup-shaped hood forming a hood-surrounding passage with the interior of the supplemental housing part and enclosing the upper portion of the filter element, external means located on said hood and clamped between the main and supplemental housing parts to support the hood in the supplemental housing part, and depending means on the hood for resiliently supporting and yieldably clamping the filter element on the hood in sealing relation, the hood being provided with an air connection in its top communicating only with said passage in the filter element and the outlet chamber in the main housing part, while said hood supporting means are formed to afford communication between said inlet chamber in the main housing part and the exterior only of the filter element by way of said annular outlet for the inlet chamber and said hood-surrounding passage.

12. The combination as claimed in claim 11 wherein said hood-supporting means comprise a circumferential external flange provided on the upper end of the hood and supported in the upper end of the supplemental housing part, and the upper surfaces of the hood and its flange and the upper end of the supplemental housing part are all substantially flush; and wherein said clamping and supporting means comprise a central stem depending from the hood top and extending through the passage in the filter element, a follower which is slidably mounted on said stem for closing the lower end of the passage in the filter element and supporting said element, and resilient means on said stem for constantly urging the follower towards the hood top to clamp the follower, the filter element and the hood top in close sealing relation.

WAYNE A. BALDWIN.